US006394476B1

(12) United States Patent
Molnar

(10) Patent No.: US 6,394,476 B1
(45) Date of Patent: May 28, 2002

(54) WHEELCHAIR SEAT HAVING ADJUSTABLE TELESCOPING ASSEMBLY

(75) Inventor: James H. Molnar, Bedford, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

(21) Appl. No.: 09/636,404

(22) Filed: Aug. 10, 2000

(51) Int. Cl.$^{7}$ .................................... B62M 1/14

(52) U.S. Cl. .............................. 280/250.1; 280/301.1; 280/657; 280/47.41; 297/316; 297/320

(58) Field of Search .......................... 280/250.1, 304.1, 280/650, 657, 47.4, 47.41; 297/320, 340, 313, 316, 319

(56) References Cited

U.S. PATENT DOCUMENTS

| | | | | | |
|---|---|---|---|---|---|
| 4,249,774 | A | * | 2/1981 | Andreasson | 297/311 |
| 4,712,830 | A | | 12/1987 | Charbrol et al. | |
| 5,094,508 | A | * | 3/1992 | Bathrick et al. | 297/320 |
| 5,409,247 | A | * | 4/1995 | Roberson et al. | 280/250.1 |
| 5,421,598 | A | * | 6/1995 | Robertson et al. | 280/250.1 |
| 5,480,172 | A | * | 1/1996 | James | 280/250.1 |
| 5,727,802 | A | * | 3/1998 | Garvin et al. | 280/304.1 |
| 5,823,621 | A | | 10/1998 | Broadhead | |
| 5,851,018 | A | | 12/1998 | Curran et al. | |
| 5,997,021 | A | | 12/1999 | Robinson et al. | |
| 6,027,132 | A | | 2/2000 | Robinson et al. | |

FOREIGN PATENT DOCUMENTS

| | | |
|---|---|---|
| DE | 299 01 471 | 9/1999 |
| EP | 0 890 497 | 1/1999 |
| EP | 1 060 723 | 12/2000 |
| FR | 2 747 305 | 10/1997 |

* cited by examiner

*Primary Examiner*—Anne Marie Boehler
(74) *Attorney, Agent, or Firm*—Hudak & Shunk Co., L.P.A.

(57) ABSTRACT

The invention pertains to wheelchairs, and more particularly, to a wheelchair seat having a seat back member which substantially maintains a constant vertical angle when the seat bottom or rail is pivotably raised and lowered. Accordingly, the angle between a seat back and seat rail is changed during adjustment of the seat rail.

15 Claims, 6 Drawing Sheets

WHEELCHAIR SEAT HAVING ADJUSTABLE TELESCOPING ASSEMBLY

FIELD OF THE INVENTION

The present invention relates to a wheelchair including a seat assembly having an upright leg member which telescopes into and out of an intermediate rear frame member in a substantially vertical manner. The seat assembly also includes a back member which maintains a substantially constant angle with respect to a vertical direction during telescoping of the upright leg member.

BACKGROUND OF THE INVENTION

The invention pertains to wheelchairs, and more particularly, to a wheelchair seat having a changeable angle between a seat back and seat bottom or rail member. Although the angle therebetween is changeable, during adjustment of the seat bottom, the seat back member substantially maintains a constant vertical angle.

Prior art structures utilize a multitude of complex designs and configurations. Although some such arrangements have been commercialized, the industry still seeks a compact, reliable, simple and economical seat assembly.

U.S. Pat. No. 5,997,021 relates to an adjustable seat back assembly for a wheelchair of the type having a frame with an upwardly extending rear frame portion and an adjustable angle seat support which includes a pivotable front end and a rear end which is secured to said rear frame portion at any of a plurality of different positions. A seat back support is mounted to a pivot on the seat support from adjacent its rear end. A link connects the seat support to a slider on the rear frame portion to maintain the position of the slider relative to the seat back support pivot as the seat angle is adjusted. A releasable seat back angle adjuster secures the seat back support to the slider at any of a plurality of positions. When the seat back angle adjuster is released, the seat back support may be folded down towards said seat support.

U.S. Pat. No. 5,851,018 relates to a lightweight wheelchair having adjustable wheel camber, adjustable toe-in/toe-out positions, and front-to-rear adjustment of the wheel assembly relative to the frame. The wheel camber is changed by removable camber tubes having plugs in opposite ends with different angular relationships. The camber tube is removed from an axle tube, related through one hundred eight degrees, and reinserted to change the wheel camber. The location of the angular recesses in the camber plugs addresses minor toe-in/toe-out adjustments while rotation of an axle tube provided with indicia assures that proper toe-in/toe-out adjustment is provided for larger wheel camber adjustments. The front to rear location of the wheels relative to the frame can be adjusted via a single fastener on each side. Moreover, the track width of the rear wheels can be adjusted in response to the change in wheel camber.

SUMMARY OF THE INVENTION

Wheelchair users often have different preferences or prescribed requirements for comfortable or proper positioning in a chair. In order to meet these needs, a wheelchair is provided having a seating assembly including a back member and a bottom member with the angle therebetween being adjustable. The seating assembly is designed so that the back member substantially maintains a constant angle with respect to vertical while the angle between the back member and bottom member is adjusted as the seat bottom is lowered.

By maintaining the back member at a constant angle, the user's center of gravity stays substantially the same, and is not allowed to move rearward upon lowering the rear of the seat, or forward upon raising of the seat, or vice versa. Another advantage of the seating assembly of the present invention is that stability and anti-tip forces are maintained even though the seating assembly is adjustable to numerous different positions. That is, if the angle of the back member were allowed to vary substantially upon lowering or raising of the chair, the wheelchair would have a greater likelihood of tipping.

Both the back member and bottom or rail member are operably connected to a seat bracket. Attached to the seat bracket is an upright leg member which telescopes downwardly into an intermediate rear frame member in order to change the angle of the seating assembly. Through independent adjustment, the angle of the back member with respect to vertical can also be adjusted.

Therefore, it is an object of the present invention to provide a wheelchair with a simple, quickly adjustable seat assembly.

BRIEF DESCRIPTION OF THE DRAWINGS

For a fuller understanding of the present invention, the a accompanying drawings incorporated in and forming a part of the specification, illustrate several aspects of the present invention, and together with the description, serve to explain the principles of the invention, wherein.

DETAILED DESCRIPTION OF THE INVENTION

Figure 1:
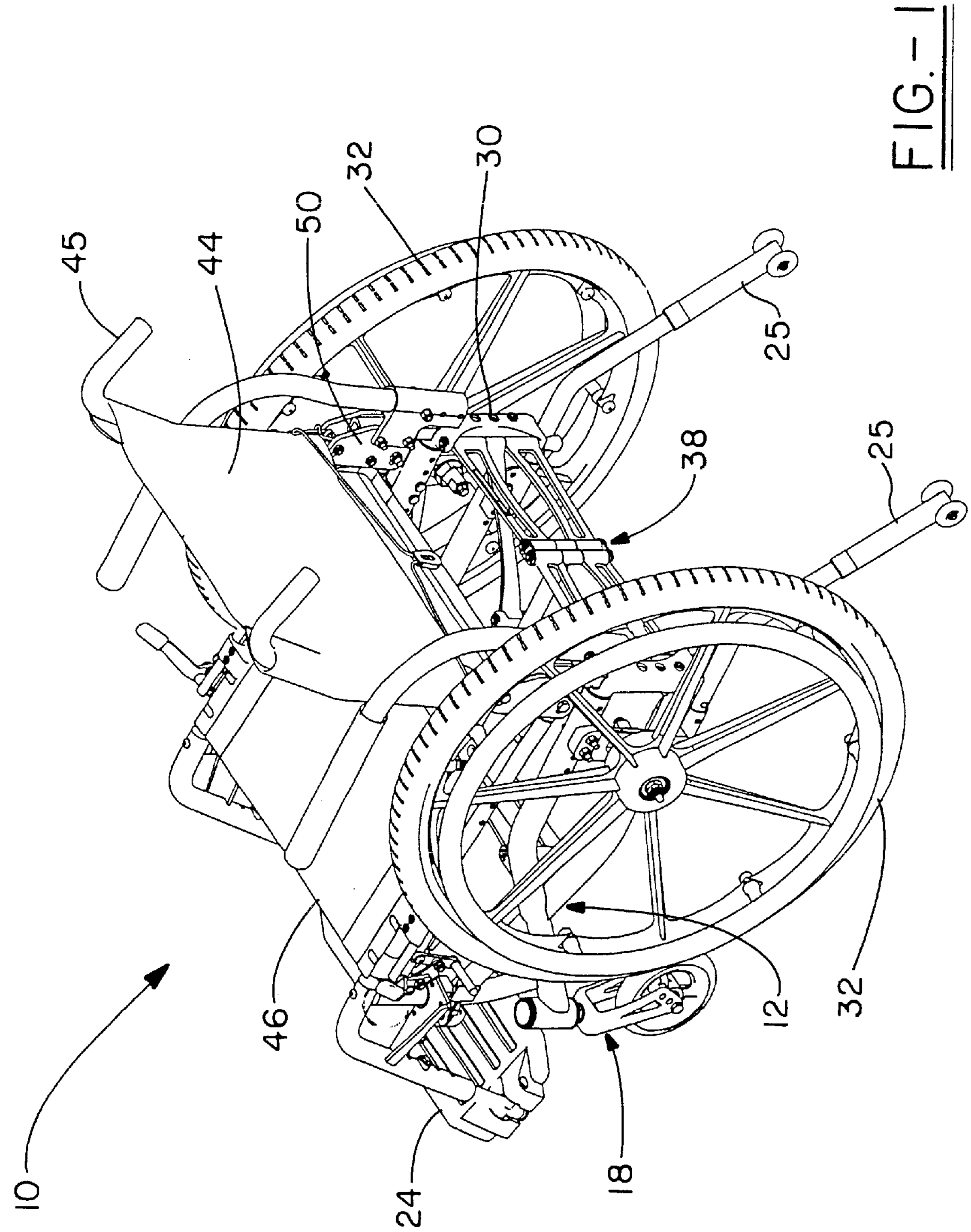
FIG. 1 is a perspective view of a manual wheelchair incorporating the adjustable seat assembly of the present invention.

The drawings are referred to now herein below for the purposes of illustrating the preferred embodiment of the invention only, and not for purposes of limiting the same. It is to be understood that the various aspects and parameters of the present invention can vary within the scope of the teachings herein.

While various components described herein below and/or shown in the drawings as located on the left-hand side or the right-hand side of the wheelchair, it is to be understood that such components exist on both sides of the chair and are generally very similar, and are usually either identical or mirror-image.

Referring now to FIG. 1, wheelchair 10 is a manual wheelchair having wheels 32 and front caster wheel assembly 18. Wheelchair 10 contains seat back member 44 and seat bottom member 46, commonly referred to as a seat rail member, operably connected through seat bracket 50. Also illustrated in FIG. 1 are optional foot rest 24 and anti-tipping devices 25. FIG. 1 further shows folding center frame 38 whereby the wheelchair can be folded into a more compact form, such as for easier storage as described in U. S. Pat. No. 4,712,830 hereby fully incorporated by reference.

Figure 2:
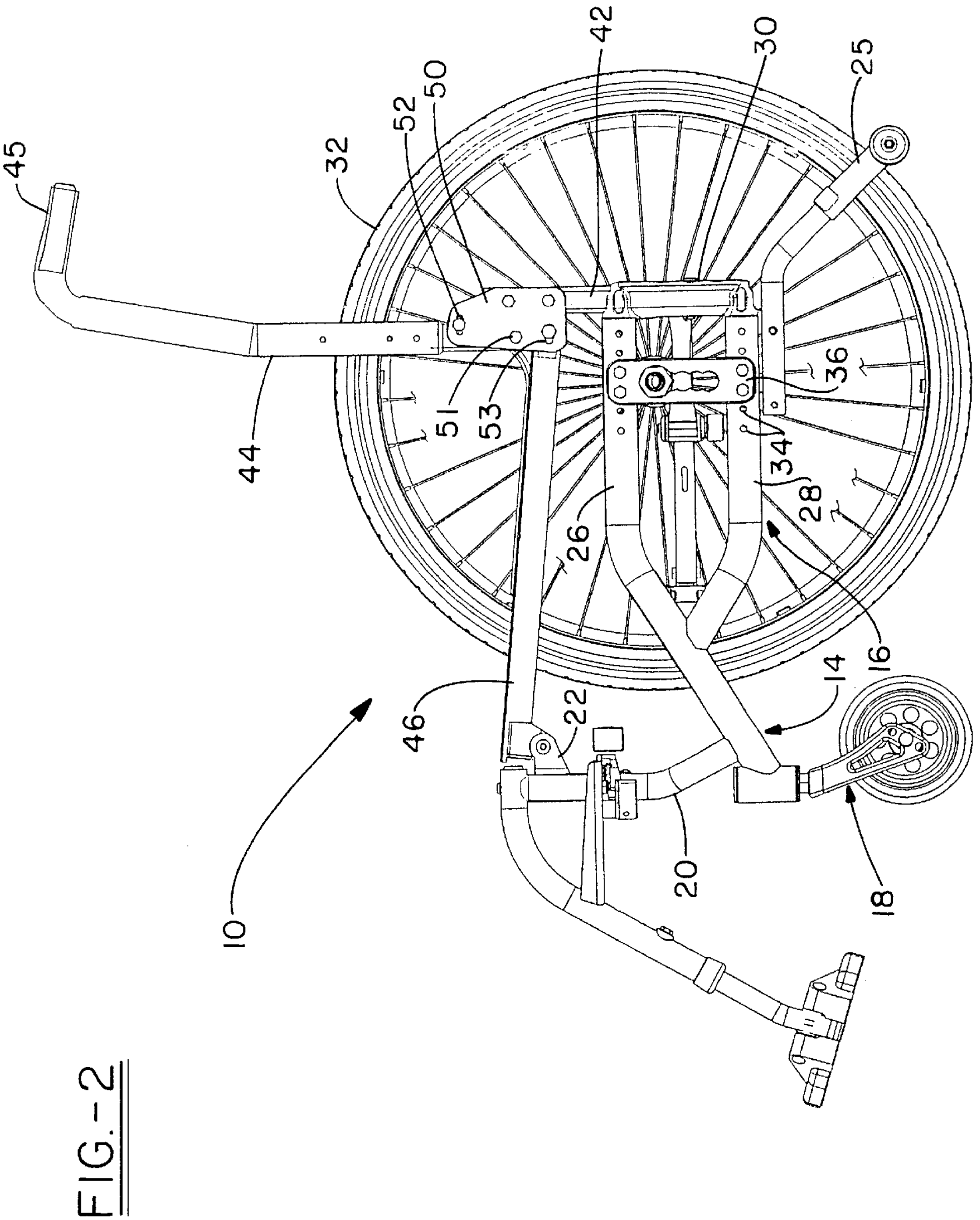
FIG. 2 is a side elevational view of selected components of FIG. 1 and particularly illustrating the seat assembly.

As illustrated in FIGS. 1 and 2, wheelchair 10 includes frame, generally denoted as 12, which has front portion 14 and rear portion 16. The front end of frame portion 14 contains front caster wheel assembly 18 so that wheelchair 10 can be readily pivoted and turned in any desirable direction. Front arm 20 of front frame portion 14 has seat rail bracket 22 desirably formed integrally thereon or attached thereto for allowing pivotal movement of seat bottom member 46.

Rear portion 16 of frame 10 includes top member 26 and bottom member 28. Intermediate rear frame member 30 is located between and attached to the ends of top and bottom members 26 and 28 respectively.

Figure 3:
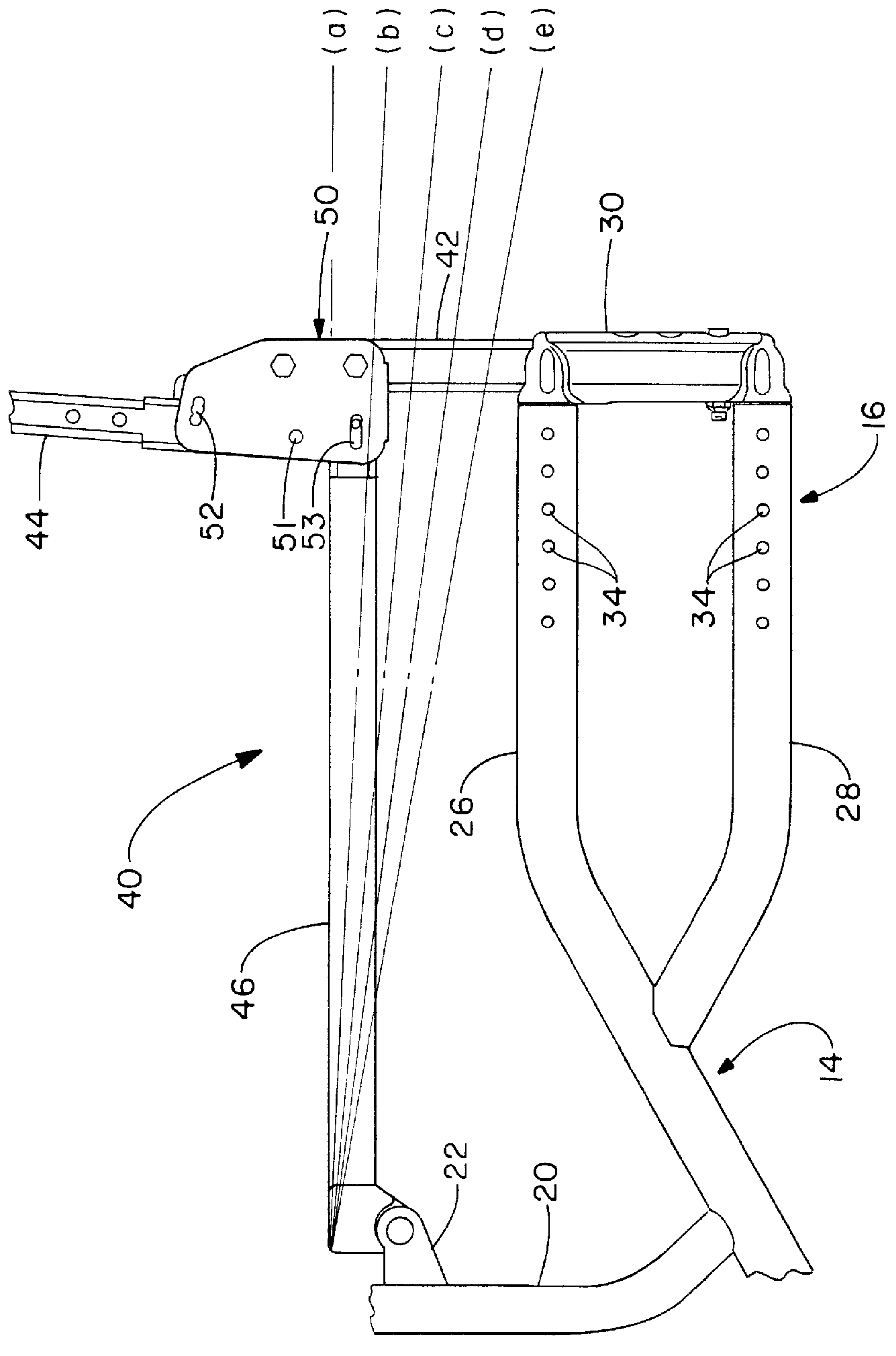
FIG. 3 is a view somewhat similar to FIG. 2 further illustrating some of the positions in which the seat assembly can be maintained.

As also illustrated in FIG. 3, seat assembly 40 includes seat back member 44 and seat rail member 46. Back member 44 can be a metal tube or any other suitable article and can have handle 45 which can be used by an individual to push the wheelchair. Likewise, seat rail member 46, as well as the rest of the wheelchair frame members can be metal tubes or any other suitable materials. Seat 40 can contain upholstery, cushions or other materials secured thereto in order to provide for the comfort or needs of the user.

Figure 4:
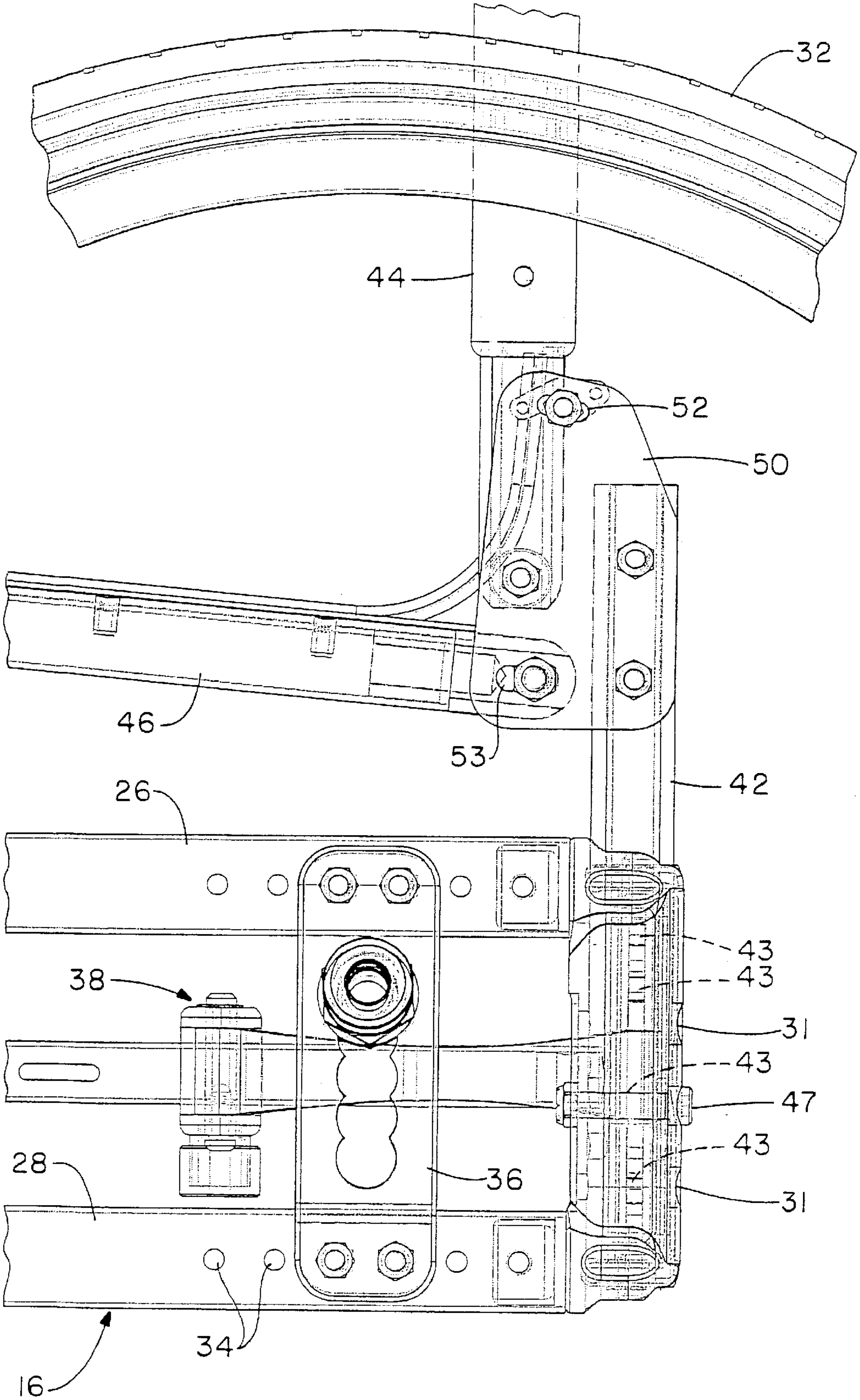
FIG. 4 is an exploded view of the upright leg member and intermediate rear frame member interface showing that the same can be adjustably positioned in numerous positions with respect to each other.

As seen in FIGS. 2, 3, and 4, seat bracket 50 is employed to operatively connect seat back member 44 to seat rail member 46. Seat bracket 50 allows back member 44 to be fixedly secured to the rail member at a number of reclining positions other than 90 degrees (i.e. vertical) with respect to horizontal. This is accomplished through seat bracket aperture 51 and a plurality of partially connected or scalloped apertures 52 and suitable fastening devices such as pins or bolts and nuts (not shown). In order to achieve a different degree of tilt for the back member, the fastening device is selectively placed in one of the partially connected apertures 52 which will then maintain back member 44 at a fixed angle with respect to vertical. Back member 44 can be fixedly positioned generally in a total range from about 20 to about 25 degrees. That is, desirably from about minus 10 or minus 5 degrees (forward) to about plus 10 or plus 15 degrees (rearward), and preferably from about minus 5 to about plus 5 degrees with respect to vertical.

Seat back member 44 can be folded down such as in a storage position when the suitable fastening device is removed from seat back member 44 and partially connected apertures 52, allowing seat back member 44 to pivot around seat back aperture 51. Seat bottom member 46 is pivotably and operatively attached to front frame arm 20 through seat rail bracket 22. The other end of seat bottom member 46 is slidably and pivotably attached to seat bracket 50 through slot 53 and is thus also operatively attached to back member 44. Slot 53 is capable of accepting a fastening device as stated above so as to allow movement in the slot between seat rail member 46 and seat bracket 50.

Upright leg member 42 is fixedly attached to seat bracket 50 as can be seen at least in FIG. 3. Upright member 42 is substantially vertically aligned and generally extends downward below the seat assembly. As seen in FIG. 3, intermediate rear frame member 30 is desirably hollow, allowing upright leg member 42 to slidably contact the same. Thus, upright leg member 42 telescopes, slidably engages, or is otherwise allowed to move upwardly and downwardly within intermediate member 30. Upon telescopic movement of upright leg member 42, seat rail member 46 pivots about rail bracket 22 whereby the rear portion of member 46 moves slightly back and forth and thus slides and pivots within slot 53. Consequently, the rear portion of seat rail member 46 can be moved up and down changing the distance, i.e. height, between said rear portion and a surface upon which the wheelchair resides, such as a floor. Lettering (a) through (e) in FIG. 3 represent some of the possible positions in which seat rail member 46 can be positioned. Also, the angle between seat back member 44 and seat rail member 46 changes when the upright member 42 is telescoped within intermediate member 30.

As upright leg member 42 telescopes within intermediate member 30, the angle of seat bottom member 46 ranges generally from about 0 to about 18 degrees desirably from about 0 to about 16 degrees and preferably from about 0 to about 13 degrees with respect to horizontal.

Figure 6:
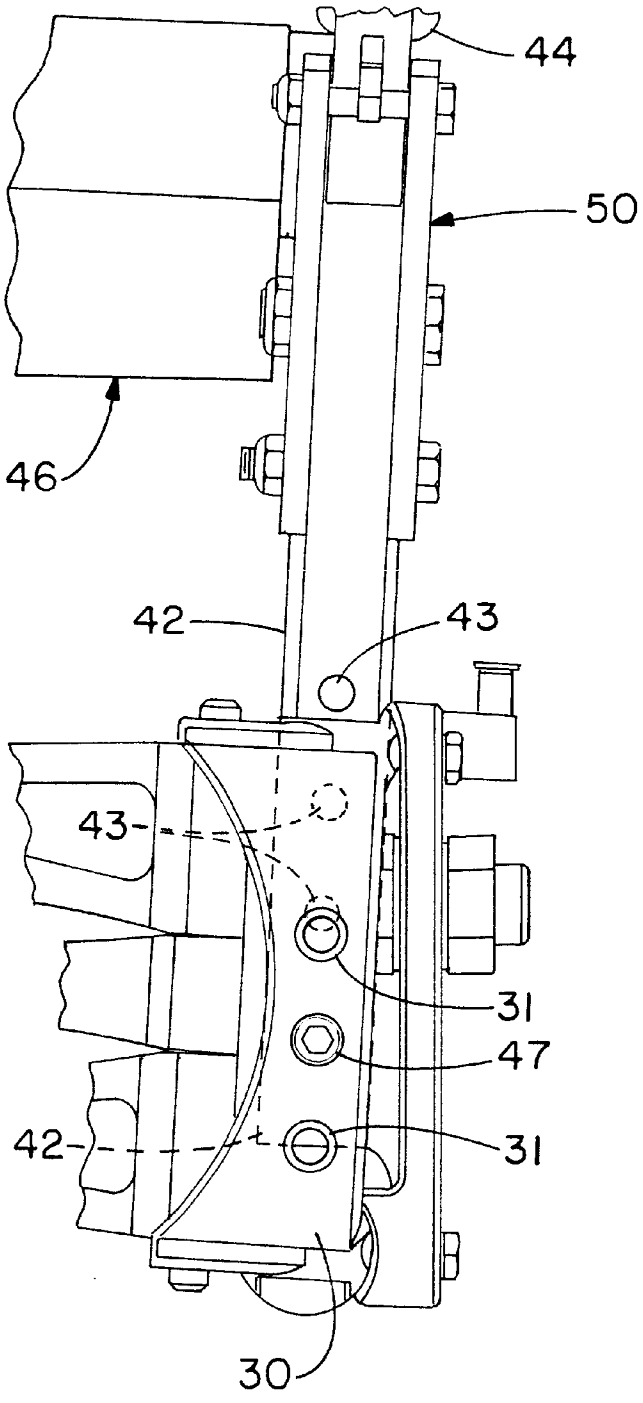
FIG. 6 is a rear elevational view of the upright leg member and intermediate rear frame member, both of which contain various holes to allow the seating assembly to be secured in numerous positions.

FIGS. 4 and 6 show that upright member 42 and intermediate member 30 have apertures or holes 43 and 31 respectively which accept at least one fastener 47 to fix the members in relation to each other. Due to the numerous holes, it is easily seen that the members may be variably positioned to achieve any of numerous desired or needed position for the users of the wheelchair. The distance of the rear portion of the bottom member 46 to the floor can be changed or adjusted utilizing the above noted apertures, generally from about 0 to about 4.0 inches, independently of rear wheelchair wheel adjustment or caster wheel adjustment, by simply telescoping the seat through upright leg member 42 to the desired position.

Figure 5:
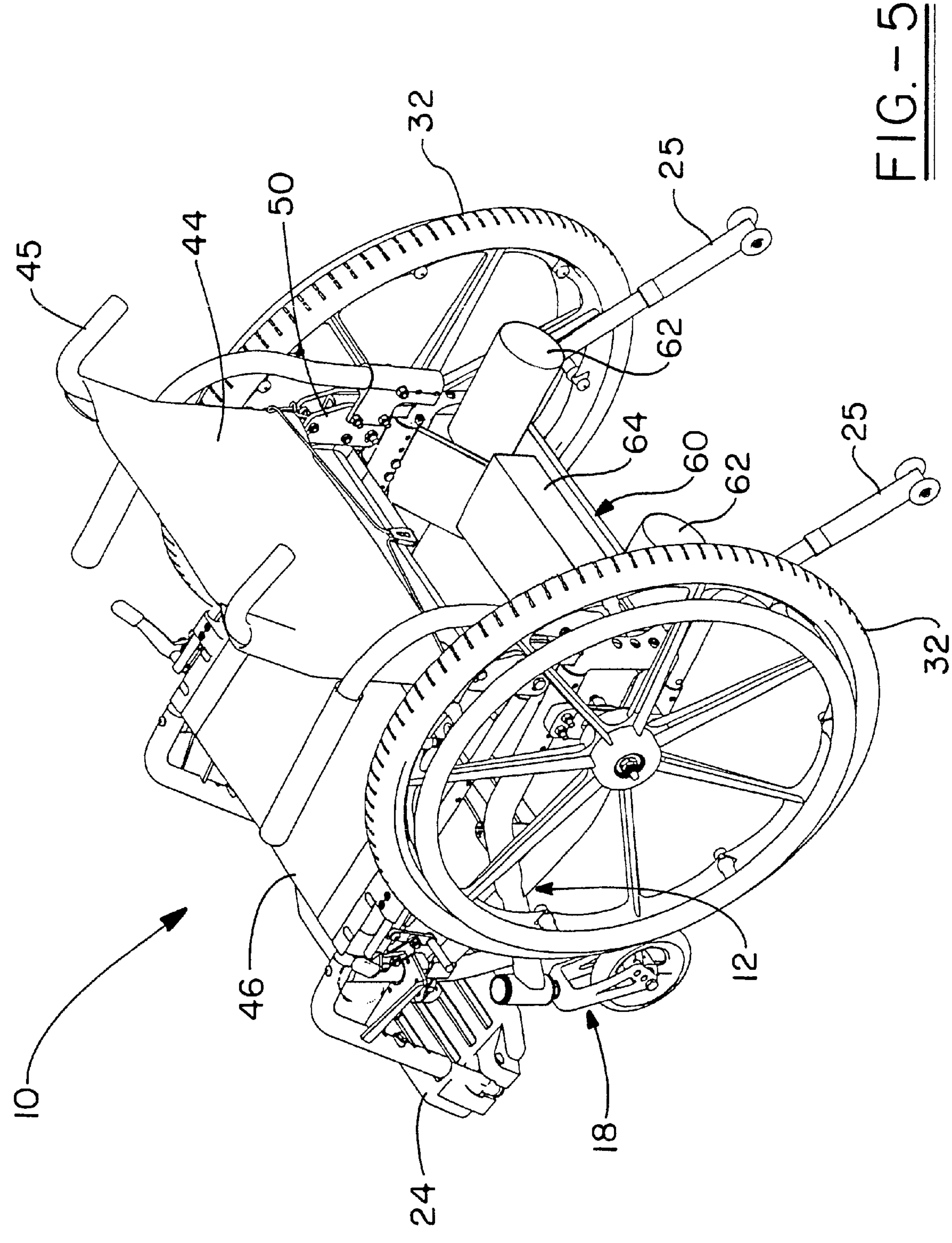
FIG. 5 is a perspective view of a power wheelchair utilizing the seating assembly of the present invention.

Wheelchair 10 is also shown with a pair of large diameter rear wheels 32 which can be adjustably located at different positions of the rear frame portion 16 via wheel bracket 36 and plurality of holes 34. Wheelchair 10, as shown in the drawings, is a folding frame manual wheelchair, but the frame can also be a rigid frame as is commonly known in the art as shown in FIG. 5 having rigid frame 60. Alternatively, as commonly known in the art, a motor 62 and supporting electronics, such as a motor, and battery 64, may be utilized to power select wheels of the chair, such as rear wheels, mid wheels, or front wheels. Moreover, the wheelchair may have different wheel sizes or other features commonly known in the art.

Obviously, other modification and alterations with respect to the wheelchair exist.

In accordance with the patent statutes, the best mode and preferred embodiment have been set forth, and the scope of the present invention is not limited thereto, but rather by the scope of the attached claims.

What is claimed is:

1. A wheelchair having a vertically adjustable seat assembly, comprising:

a frame, said frame having an intermediate rear frame member;

wheels rotatably secured to said frame;

a seat assembly, said seat assembly comprising:

a back member, a rail member, a seat bracket, and an upright leg member;

said back member, rail member, seat bracket, and upright leg member being separate and distinct members, said seat bracket connected to said back member, said seat bracket connected to said rail member, said upright leg member being vertically movable and adjustable in said intermediate frame member, wherein said upright leg member telescopically engages said intermediate rear frame member, wherein the angle between said back member and said rail member varies as said upright leg member is telescoped in said intermediate frame member, and wherein said rail member is pivotally connected to a front portion of said frame by a single pivot point.

2. A wheelchair according to claim 1, wherein said back member maintains a substantially constant angle with respect to vertical when said upright member is vertically adjusted in said intermediate frame member.

3. A wheelchair according to claim 2, wherein said upright member can be adjustably locked in relation to said intermediate frame member utilizing holes in each of said members.

4. A wheelchair according to claim 3, wherein said frame has a top member and a bottom member, and wherein said intermediate frame member is located between said frame top member and said frame bottom member.

5. A wheelchair according to claim 2, wherein said seat rail member is pivotally connected to a front frame arm of said frame front portion.

6. A wheelchair according to claim 5, wherein a rear portion of said seat rail member is adjustable in height independent of said seat back member angle position with respect to vertical.

7. A wheelchair according to claim 6, wherein said seat back member is independently adjustable with respect to vertical.

8. A wheelchair according to claim 1, wherein said seat bracket includes a slot through which the seat bracket is movably connected to said seat rail member so that the angle between said back member and said rail member can vary as said upright member slidably engages said intermediate frame member.

9. A wheelchair having an adjustable rear seat height comprising:

a seat having separate and distinct members including a back member, a rail member, a bracket, and an upright leg member, said bracket operatively connecting said back member and said rail member; and a frame, said frame having a front portion and a rear portion, said seat rail member operatively and pivotally connected to said frame front portion, said frame rear portion including an intermediate member in which said seat upright member slidably engages, and wherein said seat bracket has a slot through which the seat bracket is movably connected to said seat rail member so that the angle between said back member and said seat rail member can vary as said upright member slidably engages said intermediate frame member.

10. A wheelchair according to claim 9, wherein said back member maintains a substantially constant angle with respect to vertical when said upright member is vertically adjusted in said intermediate frame member.

11. A wheelchair according to claim 10, wherein said upright leg member can be adjustably locked in relation to said intermediate frame member utilizing holes in each of said members.

12. A wheelchair according to claim 11, wherein said frame has a top member and a bottom member, and wherein said intermediate frame member is located between said frame top member and said frame bottom member.

13. A wheelchair according to claim 12, wherein said seat rail member is pivotally connected by a single pivot point to a front frame arm of said frame.

14. A wheelchair according to claim 13, wherein a rear portion of said seat rail member is adjustable in height independent of said seat back member angle position with respect to vertical.

15. A wheelchair according to claim 14, wherein said seat back member is independently adjustable with respect to vertical.

* * * * *